(12) United States Patent  
Corazza et al.

(10) Patent No.: US 8,180,714 B2  
(45) Date of Patent: May 15, 2012

(54) AUTOMATIC GENERATION OF HUMAN MODELS FOR MOTION CAPTURE, BIOMECHANICS AND ANIMATION

(75) Inventors: Stefano Corazza, San Francisco, CA (US); Lars Mündermann, Mountain View, CA (US); Thomas P. Andrlacchl, Los Altos Hills, CA (US); Emillano Gambaretto, Bagnolo S. Vito (IT)

(73) Assignees: The Board of Trustees of the Leland Stanford Junior University, Palo Alto, CA (US); Politecnico di Milano, Milan (IT)

( * ) Notice: Subject to any disclaimer, the term of this patent is extended or adjusted under 35 U.S.C. 154(b) by 690 days.

(21) Appl. No.: 12/156,132

(22) Filed: May 29, 2008

(65) Prior Publication Data

US 2010/0020073 A1    Jan. 28, 2010

Related U.S. Application Data

(60) Provisional application No. 60/932,249, filed on May 29, 2007.

(51) Int. Cl.  
*G06E 1/00* (2006.01)  
*G06F 5/00* (2006.01)

(52) U.S. Cl. .......................... 706/12; 382/103; 345/474

(58) Field of Classification Search ...................... 706/12  
See application file for complete search history.

(56) References Cited

U.S. PATENT DOCUMENTS

| | | | |
|---|---|---|---|
| 604,707 A | 4/2000 | Kang et al. | |
| 2003/0208116 A1 | 11/2003 | Liang et al. | |
| 2003/0215130 A1 | 11/2003 | Nakamura et al. | |
| 2004/0021660 A1 | 2/2004 | Ng-Thow-Hing et al. | |
| 2006/0245618 A1* | 11/2006 | Boregowda et al. | 382/107 |
| 2007/0104351 A1* | 5/2007 | Yang et al. | 382/103 |
| 2010/0278405 A1* | 11/2010 | Kakadiaris et al. | 382/131 |

OTHER PUBLICATIONS

Wang, X.C. and Phillips, C. 2002. Multi-Weight Enveloping: Least Squares Approximation Technique for Skin Animation. ACM SIGGRAPH Symposium on Computer Animation, 129-138.

Allen, B. Curless,. B. and Popoviv, Z., 2002. Articulated Body Deformation From Range Scan Data. ACM Transactions on Graphics, 21(3), 612-619.

Allen, B. Curless,. B., and Popoviv, Z., 2003. The Space of Human Body Shapes: Reconstruction and Parameterization from Range Scans. ACM Transactions on Graphics, 22 (3), 587-594.

(Continued)

*Primary Examiner* — Omar Fernandez Rivas  
*Assistant Examiner* — Kalpana Bharadwaj  
(74) *Attorney, Agent, or Firm* — Lumen Patent Firm (57) ABSTRACT

An automated method for the generation of (i) human models comprehensive of shape and joint centers information and/or (ii) subject specific models from multiple video streams is provided. To achieve these objectives, a kinematic model is learnt space from a training data set. The training data set includes kinematic models associated with corresponding morphological models. A shape model is identified as well as one or more poses of the subject. The learnt kinematic model space and the identified shape model are combined to generate a full body model of the subject starting from as few as one-static pose. Further, to generate a full body model of an arbitrary human subject, the learnt kinematic model space and the identified shape model are combined using a parameter set. The invention is applicable for fully automatic markerless motion capture and generation of complete human models.

6 Claims, 5 Drawing Sheets  
(5 of 5 Drawing Sheet(s) Filed in Color)

OTHER PUBLICATIONS

Anguelov, D., Koller, D., Pang, H., Srinivasan, P., and Thrun, S., 2004. Recovering Articulated Object Models from 3D Range Data. Proceedings of the 20th Conference on Uncertainty in Artificial Intelligence, 18-26.

Anguelov, D., Srinivasan, P., Pang., H., Koller, D., Thrun, S., and Davis, J., 2005. The Correlated Correspondence Algorithm for Unsupervised Registration of Nonridge Surfaces. Advance in Neural Information Processing Systems 17, 33-40.

Cheung, K., M., Baker, S., and Kanade, T., 2003. Shape-Form Silhoutte of Articulate Objects and its use for Human Body Kinematics Estimation and Motion Capture. Conference on Computer Vision and Pattern Recognition (CVPR), 77-84.

Garland, M. and Heckbert, P.S., 1997. Surface Simplification Using Quadric Error Metrics. Proceedings of SIGGRAPH 97, 209-216.

Mohr, A and Gleicher, M. 2003. Building Efficient, Accurate Character Skins from Examples. ACM Transactions on Graphics, 22 (3), 562-568.

Noh, J., and Neumann, U., 2001. Expression Cloning. Proceedings of ACM SIGGRAPH 2001, 277-288.

Grochow, K. Martin, S.L., Hertzmann, A., and Popovoc, Z., 2004. Style Based Inverse Kinematics. ACM Transactions on Graphics, 22(3), 522-531.

Sand, P., McMillan, L., and Popovic, Z, 2003. Continuous Capture of Skin Deformation. ACM Transaction on Graphics, 22(3) 578-586.

Seo, H., and Magnenat-Thalmann, N., 2003. An Automatic Modeling of Human Bodies from Sizing Parameters, ACM Symposium on Interactive 3D Graphics, 19-26.

Sloan, P.-P, J., Rose, C.F., and Cohen, M.F., 2001. Shape by Example. 2001 Symposioum on Interactive 3D Graphics. 135-144.

Sumner, R.W. and Popovic, J., 2004. Deformation Transfer to Triangle Meshes. Proceedings of ACM SIGGRAPH 2004, 23(3), 399-405.

Vasilescu, M., and Terzopoulos, D., 2002. Multilinear Analysis of Image Ensembles: Tensorfaces. European Conference on Computer Vision (ECCV), 447-460.

Kahler, K., Haber, J., Yamauchi, H., and Seidel, H-P., 2002. Head Shop: Generating Animated Head Models with Anatomical Structure. ACM SIGGRAPH Symposium on Cimputer Animation, 55-64.

Lewis,. J.P., Cordner, M. and Fong, N. 2000. Pose Space Deformation: A Unified Approach to Shape Interpolation and Skeleton=Drive Deformation. Proceedings of ACM SIGGRAPH 2000, 165-172.

Vlasic, D., M. Brand, H. Pfister, and J. Popovic. Face Transfer with Multilinear Models ACM Transactions on Graphics (TOG) 24(3) 426-433.

Curless, B., and Levoy, M., 1996. A Volumetric Method of Building Complex Models from Range Images. http://graphics.stanford.edu/papers/volrange/volrange.pdf pp. 1-10.

Davis,. J. Marschner, S., Garr, M., and Levoy, M., 2002. Filing Holes in Complex Surfaces Using Volumetric Diffusion. Symposium on 3D Data Processing, Visualization, Transmission. Jun. 19-21, 2002 pp. 428-441.

Hahnel, D., Thurn, S., and Burgard, W., 2003. An Extension of the ICP Algorithm for Modeling Nonrigid Objexts with Mobile Robots. IJCAI'03 Proceedings of the 18th international joint conference on Artificial intelligence, pp. 915-920.

Hilton, A., Starck, J., and Collins, G., 2002. From 3D Shape Capture to Animated Models. International Symposium on 3D Data Processing Visualization (3DPVT) (2002). pp. 246-257.

Liepa, P., 2003. Filling Holes in Meshes. SGP '03 Proceedings of the 2003 Eurographics/ACM SIGGRAPH symposium on Geometry processing. pp. 200-205.

Smola, et al. 2004. A Tutorial on Support Vector Regression. Statistics and Computing—London 14(3) pp. 199-222.

* cited by examiner

AUTOMATIC GENERATION OF HUMAN MODELS FOR MOTION CAPTURE, BIOMECHANICS AND ANIMATION

CROSS-REFERENCE TO RELATED APPLICATIONS

This application claims priority from U.S. Provisional Patent Application 60/932,249 filed May 29, 2007, which is incorporated herein by reference.

FEDERALLY-SPONSORED RESEARCH OR DEVELOPMENT

This invention was made with Government support under contract 0325715 awarded by the National Science Foundation and with support from the Department of Veteran's Affairs. The Government has certain rights in this invention.

FIELD OF THE INVENTION

The invention relates to methods and systems for the generation of articulated human models consisting of both shape and kinematic model data that can be used in motion capture systems, biomechanics and animation.

BACKGROUND OF THE INVENTION

Markerless motion capture (MMC) has received increasing attention in the last years due to its potential in several fields such as biomechanics, clinical and sport applications, entertainment (animation, movies and gaming) and surveillance. For biomechanical, clinical and sport applications, accuracy is of paramount importance. Accurate measurement of human body kinematics is most likely achieved using for the MMC tracking a subject specific model. The subject specific model includes information on both body shape and joint centers locations.

Models for MMC have been generated in the past using passive methods since they can be implemented with the same video system used for motion capture, making the clinical use simpler and not requiring further dedicated hardware. For example, passive methods for 3D human body model acquisition have used three cameras in mutually orthogonal views that required the subject to perform a precise set of movements and constructed a model though the parametric composition of primitives. Another approach used four views where extremes were used to find feature points. This method was simple and efficient but provided only limited information on joint centers since it did not provide a solution to find elbow or wrist joints and there was no assessment of the accuracy of the method. Functional methods represent an alternative to the identification of some of the joints of the human body. They consist on estimating the center of rotation (or pivot point) between two adjacent anatomical segments by tracking the relevant motion during a specific movement. A functional approach was for example used in the identification of the joint centers of several main joints of the human body. However the model was lacking ankle and wrist joints and was lacking biomechanical rigor in aligning the joint centers to a reference pose. Moreover, the method did not provide seamless mesh of the model surface with equally spaced points, which is in general necessary for MMC tracking algorithms based on mesh registration.

Several approaches used a general geometric representation of the body segments where ellipsoidal meta-balls were used. However, to reconstruct the subject body shape with the best fidelity possible requires a free form surface. Another report discusses a seamless, robust and efficient method to generate a human model although that study did not provide automated identification of the joint centers location. Still in another report, one used a free form surface to model the upper body that required multiple subject poses. A seminal work for very accurate model generation used a space of human shapes database. However the algorithm needed manual initialization of data and model mesh correspondences and has been demonstrated to work only on laser scan quality data.

Therefore there remains an important need for automatic, accurate and efficient model generation method that can be applied to meshes with different quality ranging highly accurate laser scan meshes to coarse video based 3D reconstructions. Accordingly, the purpose of this invention was to develop and test a method capable to provide seamless free form surface model of the human body shape of the subject together with joint center locations, using just one-static capture of the pose of the subject or as few as one-static capture of the pose of the subject.

SUMMARY OF THE INVENTION

The present invention provides an automated method for the generation of human models comprehensive of shape and joint centers information. The present invention further provides an automated method for the generation of subject specific models from multiple video streams. To achieve these objectives, a kinematic model is learnt space from a training data set. The training data set includes kinematic models, defining articulated multi-segmented rigid body models, which are associated with corresponding morphological models. A shape model is identified as well as one or more poses of the subject. The learnt kinematic model space and the identified shape model are combined to generate a full body model of the subject. The generation step can start from as few as one-static pose that was identified for the subject. Further, to generate a full body model of an arbitrary human subject, the learnt kinematic model space and the identified shape model are combined using a parameter set. The combining steps are based on matching to a three-dimensional representation of the subject. The combining steps could further include imposing joint constraints. The natural application of the invention is for fully automatic markerless motion capture and generation of complete human models to be used, for example, in biomechanical analysis or characters animation. This can also be applied to fields like ergonomics, 3D modeling, motion capture, anatomy, virtual reality, design, or the like.

BRIEF DESCRIPTION OF THE FIGURES

The patent of application file contains at least one drawing executed in color. Copies of this patent or patent application publication with color drawings(s) by the Office upon request and payment of the necessary fee.

The present invention together with its objectives and advantages will be understood by reading the following description in conjunction with the drawings, in which:

FIGS. 3a, b show according to an embodiment of the invention the different stages in the model generation for different subjects (FIG. 3a and FIG. 3b). From left to right, we have the original data mesh (310 laser-scan), the pose registered data mesh overlaid with the shape model (320), the shape model (330) and the complete kinematic-anatomic model (340).

DETAILED DESCRIPTION

Typically, the space of human body shapes has a low dimensional embedding of the human body shape variability, obtained through Principal Component Analysis and generating a continuous space of human body models defined as triangular meshes. In this invention, we advanced and expanded the space of human body shapes by incorporating a space of embedded accurate kinematic models (i.e. joint centers locations). The space of kinematic models (joint centers locations) was learned from a training dataset, e.g. collected in the lab or obtained from a database, for which subjects' shape and joint centers locations were known. Accurate meshes coming from laser scans were used both to generate the training set and as a gold standard.

Using such continuous space an algorithm for pose and shape iterative registration was developed, allowing the automatic generation of a complete subject specific model from just one-static captured pose. Meshes from the laser scan or the visual hull are herein referred to as data meshes. Visual hull, as defined in the art, is a locally convex representation of the volume of an object or body obtained through volume intersection techniques generally called shape-from-silhouette.

A. Model Generation: Shape

The registration of an articulated model with a static target mesh is the objective of the pose registration algorithm. In an exemplary embodiment, the human body was modeled through a series of 13 rigid segments (head, torso, pelvis, arms, forearms, thighs, shanks and feet). In the model the body segments were linked together through 12 joints with 6 degrees of freedom each. Rotational degrees of freedom were described using exponential maps to allow a more efficient formulation of the point's positions derivatives with respect to rotational parameters. The model used a hierarchical kinematics chain with the pelvis as the root segment (other root segments could also be used).

Each degree of freedom of each joint was constrained independently from the others. Translational movements were constrained by forcing each joint to lie inside a bounding box described in the system of reference of the parent segment. Rotational movements were constrained by bounding the values of the joints projected angles onto the parent coordinate frame. These constraints assure that the model could assume only anatomically possible configurations. For a particular joint the allowed ranges of motion were equal to the maximum anatomically possible range of motion found in literature plus a safety margin.

The pose registration algorithm was advanced and expanded to articulated rigid bodies using a variation of Iterative Closest Point (ICP) algorithm. At each iteration, correspondence was established between the model points and the data points following a nearest neighbor criterion. The differential in space of a model point P, with respect to the joints rotational and translational parameters, was computed taking into account the hierarchical organization of the body kinematics chain. The total differential DP of point P with respect to joints configurations was computed as the sum of partial differentials of P with respect to each degree of freedom (DOF) of each joint:

$$DP = \sum_{d \in B_p} (\delta\omega_d \wedge_d P + \delta t_d) = \sum_{d \in B_p} \left(-_d \hat{P} \delta\omega_d + \delta t_d\right) \quad (1)$$

where $\delta\omega_d$ and $\delta t_d$ are differentials, respectively, of the exponential map, which encodes rotational DOF, and of a vector which express translational DOF of the frame associated with segment d. $B_p$ is the set of body segments which link point P to the root segment (including the root segment). $_d\hat{P}$ is the skew symmetric matrix associated to vector $_dP$ which connects point P with the origin of the reference frame associated with segment d. In this embodiment, the problem was expressed as a linearized optimization problem, and solved using Levenberg Marquardt. Each iteration of such algorithm is aimed to find the best parameters $\delta\omega$, $\delta t$ to decrease the following cost function:

$$\arg\min_{(\delta\omega, \delta t)} \sum_P \left\| \sum_{d \in B_p} -_d \hat{P} \delta\omega_d + \delta t_d - (C_p - P) \right\|^2 \quad (2)$$

where $C_P$ represents the point of the dataset to be registered with the closest to point P of the model. This involves the solution of a least square problem at each iteration. Joints constraints were enforced through both a projection of the solution into the allowed space at the end of each iteration and the addition of a soft joint consistency term to the optimization problem. With respect to previous work, in the process of this invention both rotational and translational degrees of freedom are constrained. The projection method was active in both rotational and translation components independently while the soft constraint was active only for rotational components.

The shape registration algorithm was built using a space of human shapes. In an exemplary embodiment, the database was built by registering a series of laser scans of people and performing a dimensionality reduction process using Principal Component Analysis. The space of human shapes allowed human body shapes to be expressed (as free form mesh) as a linear function of a reduced number of parameters representing the principal components of the learned shape space. Thus, although the meshes describing human body shape had typically several thousands polygons, it was possible to describe their shape by using a very limited amount of parameters. All body shapes were expressed in a reference position. For the purpose of this embodiment the first 10 principal components were used.

The shape registration algorithm found the bests shape parameters to match the model from the human shape space to the target data mesh. Model and data meshes were shape registered in the reference pose of the human shape space database. In the matching process an articulated ICP algorithm with a Levenberg-Marquardt optimization scheme was used to minimize the sum of the squared distances between corresponding points.

The last step in the shape model generation was to combine pose and shape registration. The objective of the pose shape registration was to provide a model coming from the space of human shapes to best represents the data mesh. To eliminate the variability in joint centers locations possibly due to different poses of the captured subject the data mesh was registered into the reference pose of the space of human shapes. This way all the provided models were expressed in the same pose and thus were more easily comparable. This approach offered a great advantage for the learning process of the joint centers locations as described in the next section.

Figure 1:
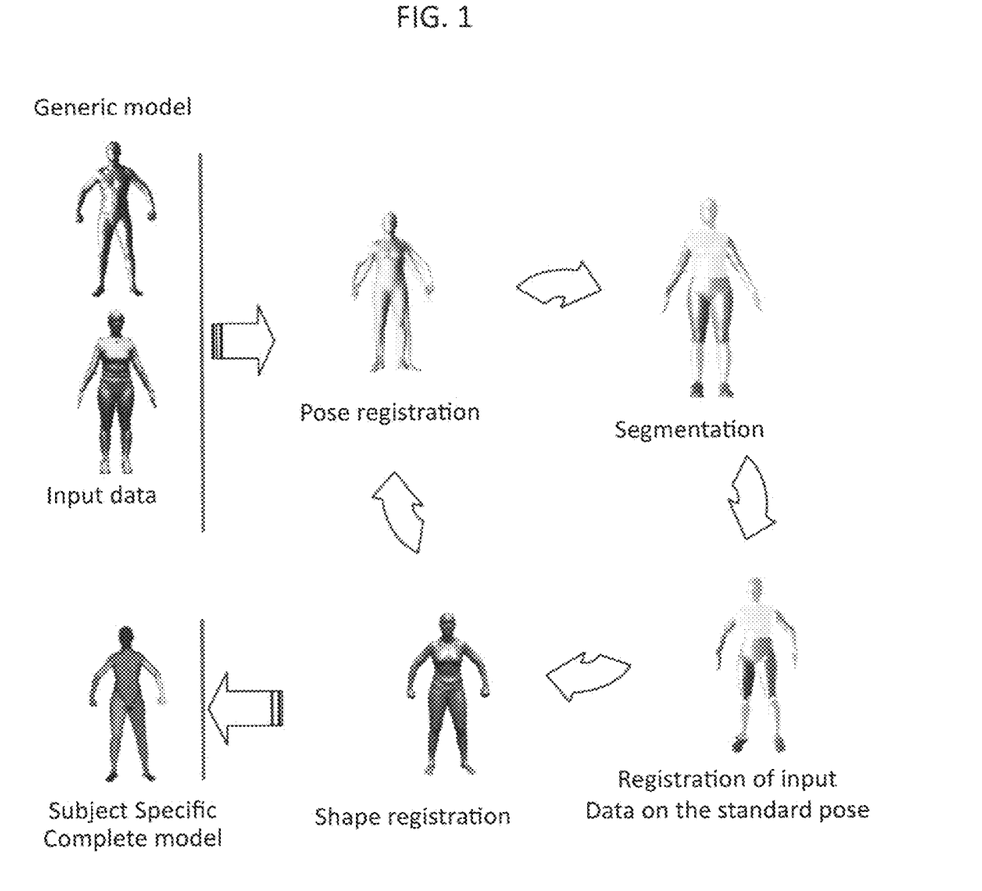
FIG. 1 shows a flow chart describing the iterative pose shape registration method according to an embodiment of the invention.

The pose shape registration algorithm was conducted according to the following steps, as shown in FIG. 1:

(i) a rigid segments articulated model obtained from a reference pose and shape of the space of human shapes was used to perform a pose registration into the data mesh. The global transformation registering every body segment was calculated;

(ii) a segmentation of the different body segments on the data mesh was performed. A proximity criteria check was used. If, for a point P in the data mesh, the closest point $C_P$ of the model belonged to segment i, then point P was labeled as belonging to that segment, and so forth for all the points in the data mesh;

(iii) for every body segment in the data mesh the inverse of the global transformation calculated in (i) was applied. This registered the data mesh into the reference pose of the space of human shapes;

(iv) the shape registration algorithm was executed, as previously described herein;

(v) the entire process was iterated until convergence. Typically 4 to 6 iterations were sufficient.

The herein presented pose shape method provided the morphological information of the model, i.e. a free form mesh, which best approximates the original data mesh.

B. Model Generation: Kinematic Model

To accurately track markerless motion capture sequences a model with accurate morphological and joint center information was needed. The objective of this part of the invention was to have a model with accurate joint centers location regardless of model shape changes.

For this a training data set was used to learn the optimal joint centers location in a subject specific model. In an exemplary embodiment, the optimal location of joint centers were learned using a pool of 9 subjects composed by 5 male and 4 female subjects of height and body weight in range of 160 to 203 cm and 41 to 130 kg, respectively.

Figure 2:
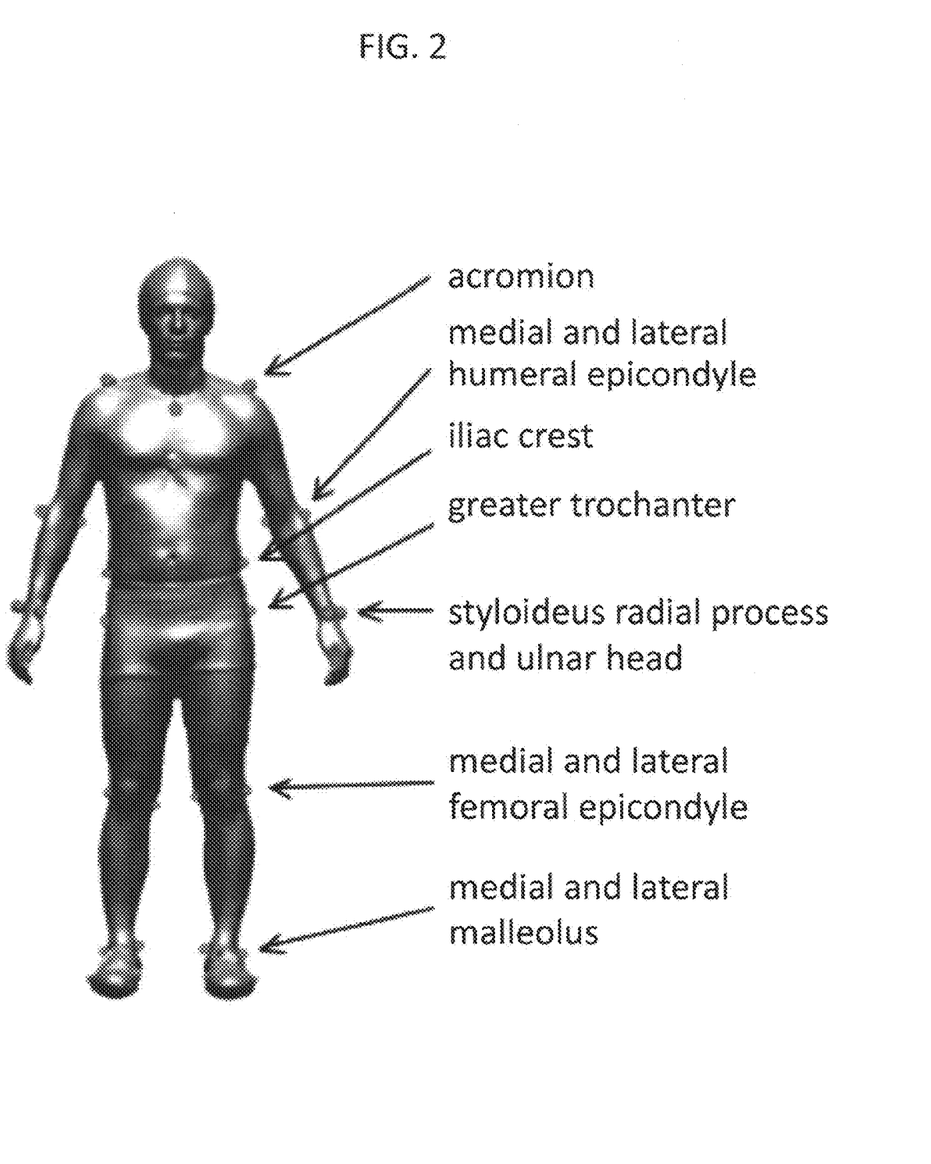
FIG. 2 shows a laser-scan of a subject with the markers placed on the anatomical landmarks according to an embodiment of the invention.
Figure 3:
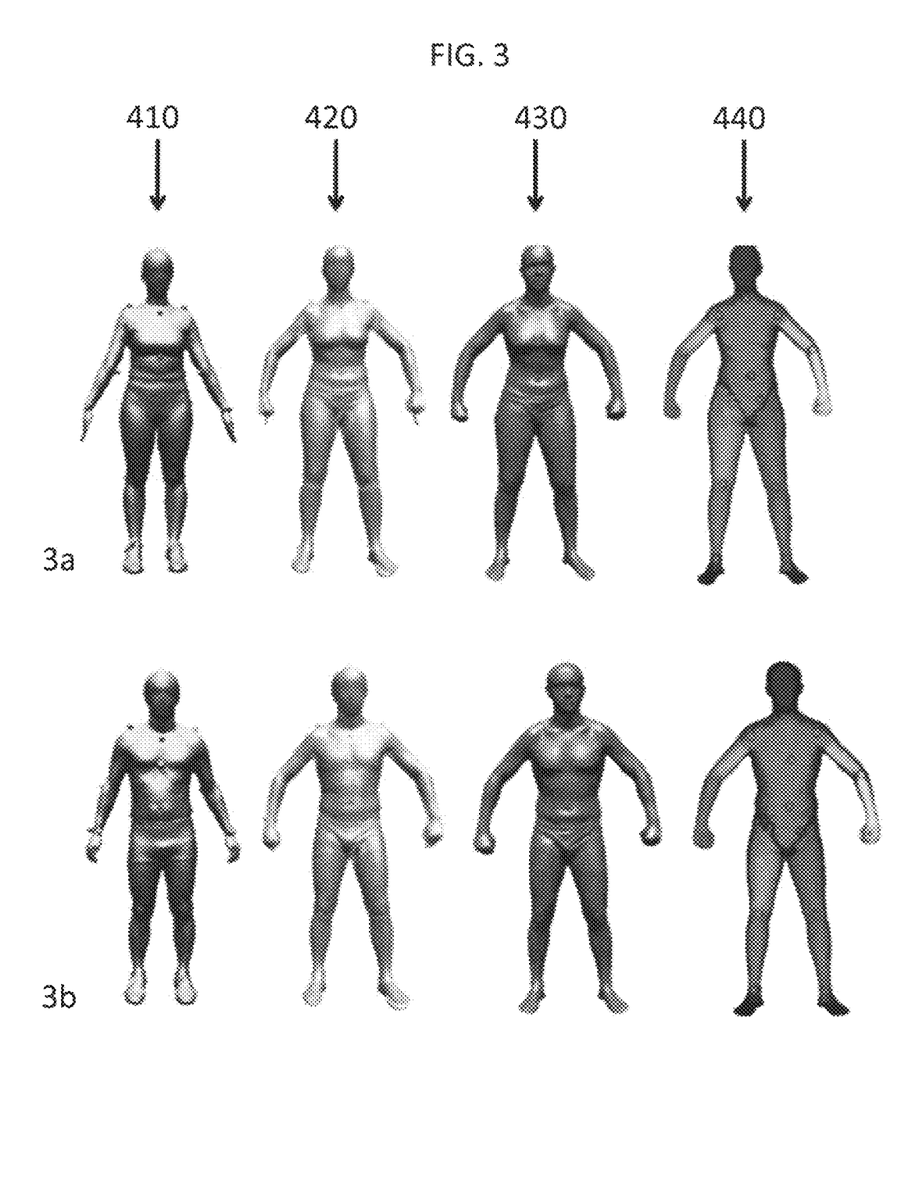
Figure 4:
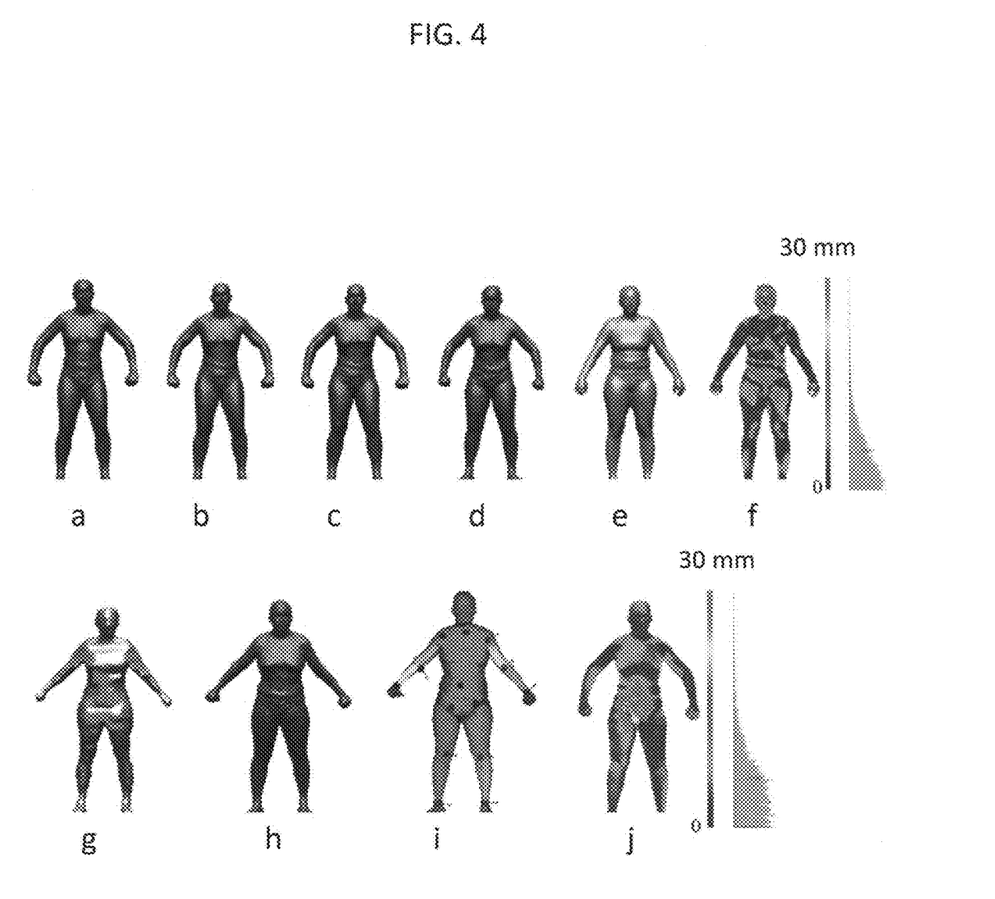
FIGS. 4a-d represent according to an embodiment of the invention the iteration steps for the identification of the shape of the model, over the input data e (laser-scan). f shows according to an embodiment of the invention the deviation between the original laser scan and the obtained model. g represents according to an embodiment of the invention a visual hull of the same subject in e. h and i represent the resulting model as a mesh or comprehensive of the joint centers, respectively. j shows according to an embodiment of the invention the shape deviations between the original laser-scan models and the visual hull for the same subject.

The training set was generated using a laser scanner to locate a set of markers placed on anatomical landmarks of interest identified through palpation (International Society of Biomechanics standards). Markers were placed in correspondence to the anatomical landmarks as described in FIG. 2, only the ones with description were used to identify the 10 joint centers at the shoulder, elbow, hip, knee, and ankle. The joint centers were calculated using anthropometric regression data and subject specific locations of the anatomical landmarks defined in FIG. 2. The 9 markered subjects were captured in a static pose using a laser scanner (Laserscan by Cyberware, CA) with 1 mm accuracy and 4 mm resolution, and approximately 15 s scanning time.

The markers were manually located in three-dimensional space and used in conjunction with anthropometric methods to identify the joint center locations. For example, the knee joint center was identified as the mid point of the femur transepicondylar segment described by the marker placed on the lateral and medial femoral epicondyle. For the ankle joint, since the subjects were wearing shoes (affecting the accuracy of the registration, since in the space of human shapes the model was barefoot), the ankle joint center was identified through virtual palpation on the 3D mesh of the medial and lateral malleoli.

Once all the joint centers were identified the pose shape registration algorithm described supra was used to bring both the data mesh and the joint centers in the reference pose of the space of human shapes. At this point, the dataset was ready to be used since 9 meshes from the space of human shapes (for which 1-to-1 point correspondence held) and their relevant joint centers were all placed in the same reference pose (see FIG. 2).

To make the process of model generation fully automatic the joint centers locations were linked to some reliable features on the mesh (such as e.g. vertexes, regions with particular curvature, edges, etc.). This way every time a pose shape registration was performed on some data mesh the joint centers locations information would be automatically provided. The best candidate features for linking the joint centers with mesh were the points (vertexes of the mesh) close to the joint center of interest. For every subject i and every joint j a set $s_{ij}$ of n points on the model mesh representing the closest points to joint j was identified. The objective of the process is to minimize the generalization error, defined as the error we can expect on subjects not present in the training set. To compute the generalization error one subject at the time was excluded from the training set and the results verified over that subject. The n minimizing the generalization error turned out to be n=7. This means that for every joint and every subject there were 7 corresponding points (vertexes in the mesh) selected among the joint center closest points. They are the points described in the second term of Equation (3).

Once the learning was accomplished, the location of the joint j of the subject i was identified, according to equation (3), as linear combination of the coordinates of the points belonging to set $s_{ij}$.

$$(a_1 \ a_2 \ \ldots \ a_n)_j \begin{bmatrix} x_{1i} & y_{1i} & z_{1i} \\ x_{2i} & y_{2i} & z_{2i} \\ \ldots & \ldots & \ldots \\ x_{ni} & y_{ni} & z_{ni} \end{bmatrix} = (\bar{x}_{ji} \ \bar{y}_{ji} \ \bar{z}_{ji}) \quad (3)$$

where $(\bar{x}_{ji} \bar{y}_{ji} \bar{z}_{ji})$ represents the coordinates of the joint center j in the reference pose of the space of human shapes.

The training set was made of i={1, 2, 3, . . . , k} subjects with k=9 and for each of them we identified j={1, 2, 3, . . . , m} joints with m=10. For every joint j the regression coefficients $\alpha_j$ were obtained from the solution of the linear system (4):

$$[X_{j1} X_{j2} \ldots X_{jk} 1]^T \alpha_j = (\bar{x}_{ji} \bar{y}_{ji} \bar{z}_{ji} 1)^T \quad (4)$$

The choice of the number of points n in the sets $s_{ij}$ (joint closest points to be used in the second term of equation (3)) was achieved minimizing the generalization error expressed as the average of the cross-validation error obtained leaving one subject off the training set at the time.

The results were iterated between the model shape algorithms and the model kinematic learning algorithm until no sensible variation was present in the results.

A practical validation on the use of visual hull data instead of laser scanner data to track walking sequences was performed (FIG. 6) by comparing the results of two sequences of two different subjects not included in the training set (1 male, age 25, height 1.77 m, weight 62 kg, 1 female, age 23, height 1.70 m, weight 72) tracked using either a manually set up model or a model generated using the presented method on visual hull data. Manually setting up a model included manually segmenting the model breaking it down to its anatomical segments and performing a three dimensional digitization of the markers attached in correspondence of the anatomical landmarks to identify the joint centers.

Results

Figure 5:
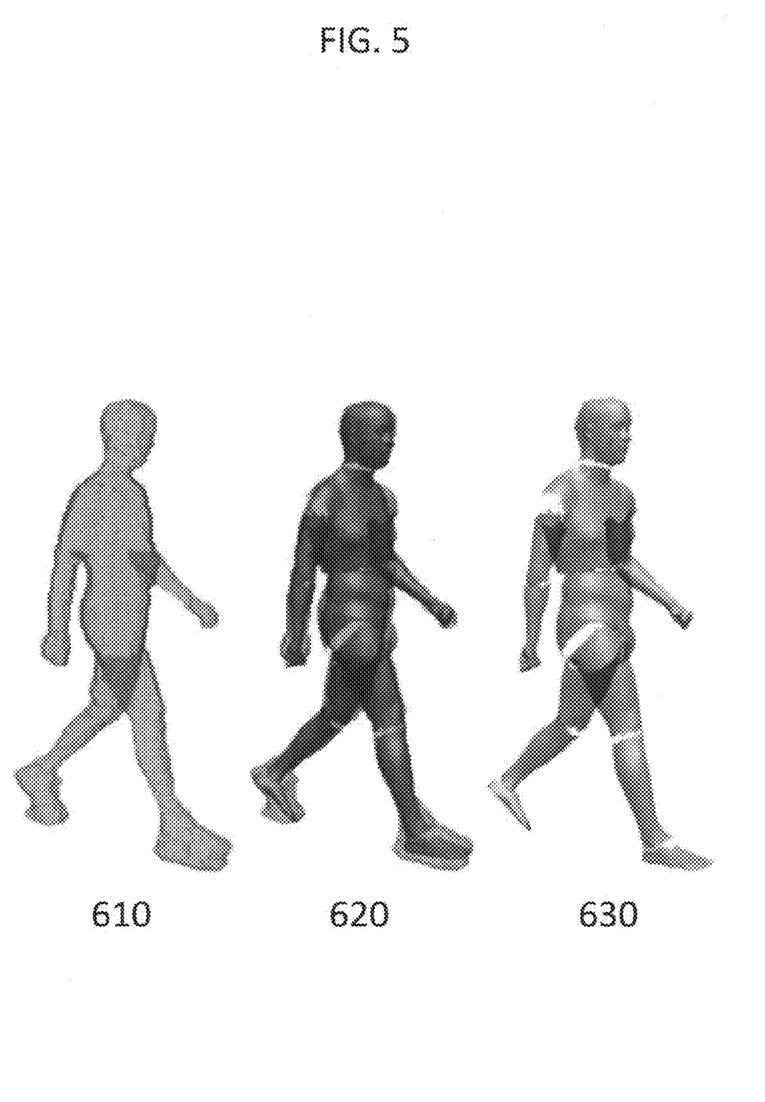
FIG. 5 shows according to an embodiment of the invention deviations on knee joint angles during a gait trial on a subject not included in any of the training sets. On the right visual hull (510), visual hull with matched model (520) generated using the presented method and a static visual hull as input data, and model alone (530). The graphs are relative to one of the two subjects who performed the gait trial test.

The shape fidelity of the algorithm applied on raw laser scans (FIGS. 4a. 4b) indicate average deviations on the order of 5 mm between the original laser scan and the model coming out of the pose-shape matching algorithm. The sequences from left to right in FIGS. 5a-5d show the algorithm progression over 4 iterations. In FIG. 5f the same results are presented for a subject (FIG. 5e) not belonging to the training set, showing the same level of accuracy obtained for subjects in the training set (average error 6 mm).

To estimate the accuracy in the location of the joint centers through the presented algorithm, across validation over all 9 subjects was performed showing an average accuracy below 25 mm. The error is defined as the distance between the 3D location of the joint centers as predicted by the algorithm and the gold standard location defined through the anatomical landmarks. The results for all the 10 analyzed joints are reported in Table 1.

TABLE 1

Training errors and generalization errors (from cross validation) for the shoulder, elbow, hip, knee and ankle joints, for all 9 subjects.

| | Absolute Mean Err. | St Dev |
|---|---|---|
| Training Error - [mm] | | |
| Shoulder | 22 | 8 |
| Elbow | 20 | 9 |
| Hip | 37 | 23 |
| Knee | 10 | 5 |
| Ankle | 6 | 3 |
| Generalization Error - [mm] | | |
| Shoulder | 30 | 16 |
| Elbow | 25 | 9 |
| Hip | 47 | 35 |
| Knee | 14 | 7 |
| Ankle | 9 | 7 |

The automatic generation of a model directly from a visual hull, thus not requiring expensive dedicated hardware like a laser scanner is another contribution of the invention. FIGS. 5g, 5h and 5i show the results for a subject not belonging to the training set; FIG. 5j represents the color map of the deviation between the model obtained from the visual hull and the model obtained from the laser scan. The visual hulls of the example were built using standard video cameras as used in common video motion-capture systems. In this particular case the visual hulls were obtained using an 8 VGA cameras system (Basler). Using a visual hull (FIG. 5g) instead of a laser scan (FIG. 5e) to automatically generate the model led to the results shown in FIG. 5h having an average deviation of 6 mm (FIG. 5j). To demonstrate the feasibility of a model generation algorithm that can work accurately using visual hull data as input, an experimental walking sequence (the most typical clinical gait analysis trial) was tracked using models obtained by applying the model generation algorithm described in this invention to reference visual hulls (FIG. 5g). The subject analyzed was not included in any of the training sets and results are shown in FIG. 6. The outcome was compared with the results coming from the same sequence tracked with a manually set up model obtained through laser scanner.

The average results from the two tested subjects led to: i) mean absolute deviations on sagittal and frontal planes kinematics at the knee joint calculated from experiments [15, 4] of 1.6° (1.5°) and 1.3° (1.2°) for flexion and adduction, respectively (FIG. 6); ii) mean absolute deviations in the determination of the knee joint centers of 3 mm, 10 mm and 6 mm in the medio-lateral, vertical and antero-posterior directions, respectively. The mean absolute deviations for the hip joint centers were 3 mm (medio-lateral), 10 mm (vertical) and 7 mm (antero-posterior) while for the ankle joint they were 4 mm (medio-lateral), 9 mm (vertical) and 9 mm (antero-posterior). This leads to an average RMS error for the knee, hip and ankle joint centers of 16 mm, 15 mm and 17 mm, respectively.

As one of ordinary skill in the art will appreciate, various changes, substitutions, and alterations could be made or otherwise implemented without departing from the principles of the present invention. Accordingly, the scope of the invention should be determined by the following claims and their legal equivalents.

What is claimed is:

1. A method for generating subject-specific human motion capture models having morphological and kinematic model information, comprising:
    (a) learning a kinematic model space from a training data set, said training data set comprises kinematic models associated with corresponding morphological models;
    (b) using a series of meshes describing human body shape to perform a shape registration algorithm for identifying and registering from a database a shape model of a human subject in one or more poses;
    (c) combining said learnt kinematic model space and said identified shape model to generate a full body model of said human subject, said generating starts from as few as one of said poses identified in step (b); and
    (d) combining said learnt kinematic model space and said identified shape model to generate a full body model of an arbitrary human subject, said generating using a parameter set.

2. The method as set forth in claim 1, wherein said step of combining in 1(c) and/or 1(d) are based on matching to a three-dimensional representation of the subject.

3. The method as set forth in claim 1, wherein said kinematic models define an articulated multi-segmented rigid body model.

4. The method as set forth in claim 1, wherein said steps 1(a) through 1(d) are performed in a fully automated fashion.

5. The method as set forth in claim 1, wherein said step 1(d) is performed in an automated fashion.

6. The method as set forth in claim 1, wherein said step of combining in 1(c) and/or 1(d) further comprises imposing joint constraints.

* * * * *